(12) United States Patent
Kippes et al.

(10) Patent No.: US 12,256,668 B2
(45) Date of Patent: Mar. 25, 2025

(54) METHOD FOR OPERATING A GARDENING APPLIANCE, AND GARDENING APPLIANCE

(71) Applicant: Andreas Stihl AG & Co. KG, Waiblingen (DE)

(72) Inventors: Markus Kippes, Brannenburg (DE); Ingo Kugler, Waiblingen (DE); Tobias Froehlich, Marbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 683 days.

(21) Appl. No.: 17/451,581

(22) Filed: Oct. 20, 2021

(65) Prior Publication Data

US 2022/0117155 A1 Apr. 21, 2022

(30) Foreign Application Priority Data

Oct. 21, 2020 (EP) ..................................... 20203148

(51) Int. Cl.
*A01D 34/68* (2006.01)
*A01D 34/00* (2006.01)
(Continued)

(52) U.S. Cl.
CPC ....... *A01D 34/6812* (2013.01); *A01D 34/006* (2013.01); *A01D 69/02* (2013.01);
(Continued)

(58) Field of Classification Search
CPC .. A01D 34/6812; A01D 34/006; A01D 69/02; A01D 69/08; A01D 69/10; A01D 2034/6837; A01D 2101/00
See application file for complete search history.

(56) References Cited

U.S. PATENT DOCUMENTS 3,999,643 A 12/1976 Jones
4,987,729 A * 1/1991 Paytas .................... A01D 69/02
320/101

(Continued)

FOREIGN PATENT DOCUMENTS

CN 104904405 A 9/2015
CN 106900690 A 6/2017
(Continued)

OTHER PUBLICATIONS

German-language European Search Report issued in European Application No. 20203148.0 dated Mar. 17, 2021 with a partial English translation (eight (8) pages).

*Primary Examiner* — Jacob D Knutson
(74) *Attorney, Agent, or Firm* — Crowell & Moring LLP

(57) ABSTRACT

A gardening appliance has a traction drive system with a clutch, an electric motor drive system and a user-triggerable signalling device. The electric motor drive system effects forward rotation and backward rotation of the clutch. An operating method includes: a) in a user-triggered manner, operating the electric motor drive system in a running-down and/or braking operating mode to lower a motor rotational speed of the forward-rotating electric motor drive system; b) acquiring whether a back electromotive force caused by the electric motor drive system satisfies a standstill criterion, wherein the standstill criterion is characteristic of an attainment of a standstill state of the electric motor drive system; and c) when the standstill criterion is satisfied, operating the electric motor drive system in a backward-rotation operating mode to effect the backward rotation of the electric motor drive system for disengaging the clutch for freewheeling operation.

17 Claims, 4 Drawing Sheets

(51) Int. Cl.
  *A01D 69/02* (2006.01)
  *A01D 69/08* (2006.01)
  *A01D 69/10* (2006.01)
  *A01D 101/00* (2006.01)

(52) U.S. Cl.
  CPC ............ *A01D 69/08* (2013.01); *A01D 69/10* (2013.01); *A01D 2034/6837* (2013.01); *A01D 2101/00* (2013.01)

(56) References Cited

U.S. PATENT DOCUMENTS

| | | |
|---|---|---|
| 9,759,300 B2 | 9/2017 | Barendrecht |
| 9,787,225 B2 * | 10/2017 | Lucas .................... E01H 5/045 |
| 10,130,031 B2 | 11/2018 | Yoshimura et al. |
| 2007/0272510 A1 | 11/2007 | Kawakami |
| 2017/0265385 A1 * | 9/2017 | Yoshimura ........... A01D 34/006 |

FOREIGN PATENT DOCUMENTS

| | | | |
|---|---|---|---|
| EP | 1 860 340 A1 | 11/2007 | |
| EP | 3 219 190 A1 | 9/2017 | |
| FR | 2940773 A1 * | 7/2010 | ......... A01D 34/6806 |
| WO | WO-9401993 A1 * | 2/1994 | ........... H01R 13/447 |
| WO | WO 2014/174173 A1 | 10/2014 | |

* cited by examiner

METHOD FOR OPERATING A GARDENING APPLIANCE, AND GARDENING APPLIANCE

CROSS REFERENCE TO RELATED APPLICATION

This application claims priority under 35 U.S.C. § 119 from European Patent Application No. 20203148.0, filed Oct. 21, 2020, the entire disclosure of which is herein expressly incorporated by reference.

BACKGROUND AND SUMMARY OF THE INVENTION

The invention relates to a method for operating a gardening appliance and to a gardening appliance.

The object of the invention is to provide a method for operating a gardening appliance and to provide a gardening appliance, each of which has improved characteristics, in particular allows a high level of user-friendliness and/or a long service life of the gardening appliance.

The invention achieves said object through the provision of a method and of a gardening appliance in accordance with the independent claims. Advantageous developments and/or refinements of the invention are described in the dependent claims.

The, in particular automatic, method according to the invention is designed or configured or provided for, in particular automatically, operating an, in particular electrical, gardening appliance. The gardening appliance comprises or has an, in particular electrical, traction drive system. The traction drive system comprises or has, in particular for forward drive or for propulsion of the garden appliance, a clutch, an electric motor drive system and a user-triggerable, in particular electrical, signalling device. The clutch is designed or configured to, in particular only, as a result of forward rotation, in particular of a part of the clutch, automatically or independently engage for forward drive of the gardening apparatus and, as a result of backward rotation, which is in particular opposite or reversed in relation to the forward rotation, of in particular a, in particular the, part of the clutch, automatically or independently disengage or release for freewheeling of the gardening appliance. The electric motor drive system is designed or configured to effect the forward rotation, in particular in order to engage the clutch, for forward drive of the gardening appliance and to effect the backward rotation of the clutch, in particular of the part of the clutch, in particular in order to disengage the clutch, for freewheeling of the gardening appliance. The method comprises or has the following steps: a) in a user-triggered manner by way of a change in an, in particular variable and/or electrical, signal state, in particular in a value of the signal state, in particular in a travel signal state, of the signalling device, operating, in particular automatically operating, the electric motor drive system in a running-down and/or braking operating mode in order to lower a motor rotational speed, in particular a value of the motor rotational speed, in particular in order to attain a standstill state, of the forward-rotating electric motor drive system. b) Acquiring, in particular automatically acquiring, or detecting or measuring, in particular monitoring, whether a back electromotive force, in particular a value of the force, caused by the electric motor drive system, which has in particular run down and/or is running down, or a variable based on the back electromotive force, in particular a value of the variable, satisfies, or in particular does not satisfy, a standstill criterion. The standstill criterion is characteristic of an in particular past and/or present and/or future attainment of a standstill state of the electric motor drive system. c) If or when the standstill criterion is met, operating, in particular automatically operating, the electric motor drive system in a backward-rotation operating mode to effect the backward rotation of the electric motor drive system, which is in particular at a standstill, for the purposes of disengaging the clutch for freewheeling of the gardening appliance.

This, in particular the traction drive system, makes it possible that a user of the gardening appliance does not need to push said gardening appliance. This allows a high level of user-friendliness. Additionally or alternatively, this, in particular step b), makes it possible to ensure that step c) is carried out, or the electric motor drive system is operated in the backward-rotation operating mode, in particular only if or when the motor rotational speed is low, in particular the electric motor drive system is at a standstill, in particular owing to the execution of step a) or the operation of the electric motor drive system in the running-down and/or braking operating mode. This thus makes it possible for an, in particular mechanical, load on the traction drive system, in particular the clutch, to be kept low or even to be avoided entirely. This thus allows a long service life of the traction drive system, in particular of the clutch, and thus of the gardening appliance. Further additionally or alternatively, this, in particular the method, allows freewheeling of the gardening appliance, in particular without, in particular great, effort on the part of the user. This, in particular the freewheeling, thus allows the user to easily manoeuvre the gardening appliance, in particular pull it backward, if necessary, such as e.g. in a garage. This thus allows a high level of user-friendliness.

In particular, the gardening appliance may be a gardening work appliance. Additionally or alternatively, the gardening appliance may be hand-guided and/or ground-guided. Further additionally or alternatively, the gardening appliance may have a mass of at most 100 kilograms (kg), in particular of at most 50 kg, in particular of at most 20 kg, and/or of at least 5 kg, in particular of at least 10 kg.

The clutch may have, in particular be, a positively engaging clutch. Additionally or alternatively, the clutch may be designed to remain disengaged in the absence of forward rotation, in particular by means of the electric motor drive system.

Automatic may mean, in particular directly, independent of the user.

At one and the same point in time, the electric motor drive system can either rotate forward or rotate backward.

The operation of the electric motor drive system in the running-down operating mode need not or may not allow backward rotation of electric motor drive system. Additionally or alternatively, the running-down operating mode can be referred to as idling operating mode.

The running-down and/or braking operating mode and the backward-rotation operating mode may differ.

The back electromotive force may be dependent on the motor rotational speed, in particular proportional to the motor rotational speed. Additionally or alternatively, in step b), the back electromotive force may be acquired. Further additionally or alternatively, it may be acquired in step b) that the standstill criterion is met if or when no back electromotive force or no variable can be acquired or is acquirable or the force or the variable cannot be acquired or is not present or is zero, in particular when the motor rotational speed is zero or the electric motor drive system is at a standstill.

If the standstill criterion is not met, in particular within a specified time period, step c) or the method need not or may not be executed further, or may be cancelled.

Step c) need not or may not be executed, in particular directly, in a manner triggered by a user by way of a, in particular the, change in the signal state of the signalling device.

Step c) may be carried out at a time after step b).

In a development of the invention, the gardening appliance is a lawnmower.

In a development of the invention, the clutch comprises or has at least one dog clutch. The dog clutch is designed or configured to, as a result of backward rotation, in particular of a part of the dog clutch, automatically or independently disengage or release, in particular for freewheeling of the gardening appliance. Additionally or alternatively, the clutch comprises or has at least one inclined-surface actuating mechanism. The inclined-surface actuating mechanism is designed or configured in particular to effect the backward rotation, in particular of the part, of the dog clutch and, in particular only, as a result of forward rotation, to effect the automatic or independent engagement, in particular of the dog clutch, in particular for forward drive of the gardening appliance. In particular, the electric motor drive system can be designed to effect the forward rotation, in particular in order to engage the dog clutch, for forward drive of the gardening appliance and to effect the backward rotation of the inclined-surface actuating mechanism, in particular in order to disengage the dog clutch, for freewheeling of the gardening appliance. Additionally or alternatively, the inclined-surface actuating mechanism may be designed to effect the forward rotation of the dog clutch, in particular for the forward drive of the gardening appliance.

In a development of the invention, the electric motor drive system comprises or has a direct current motor or a direct current drive motor, in particular a permanent magnet direct current (PMDC) motor or a permanent magnet direct current drive motor. The direct current motor is designed or configured to effect the forward rotation and the backward rotation of the clutch. This allows the operation of the electric motor drive system in at least the running-down down and/or braking operating mode and/or the acquisition of whether the back electromotive force or the variable satisfies the standstill criterion. In particular, the motor rotational speed may be a motor rotational speed of the direct current motor.

In a development, in particular a refinement, of the invention, the electric motor drive system comprises or has an, in particular electronic, bridge circuit, in particular a full bridge circuit, in particular a four-quadrant chopper, for operating the electric motor drive system, in particular having the direct current motor, in at least the run-down and/or braking operating mode and the backward-rotation operating mode.

In a development of the invention, in step a), the braking operating mode is a short-circuit braking operating mode. Additionally or alternatively, step b) is carried out, in particular only, at a time after step a), in particular and not at a time before and/or at the same time as step a). This, in particular the operation of the electric motor drive system in the short-circuit braking operating mode, allows a fast reduction of the motor rotational speed, in particular a fast attainment of the standstill state, of the forward-rotating electric motor drive system. Additionally or alternatively, this, in particular the execution of step b) at a time after step a), allows the acquisition of whether the back electromotive force or the variable satisfies the standstill criterion. In particular, the operation of the electric motor drive system in the short-circuit braking operating mode need not or may not allow backward rotation of the electric motor drive system. Additionally or alternatively, the acquisition of whether the back electromotive force or the variable satisfies the standstill criterion need not or may not be possible at the same time as the operation of the electric motor drive system in the short-circuit braking operating mode.

In a development of the invention, step a) is carried out, in particular exactly, for a, in particular fixedly, specified time period, in particular a specified value of the time period, in particular in a manner dependent on a most recent motor rotational speed, in particular a value of the motor rotational speed, or a most recent variable corresponding, in particular proportional, to the most recent motor rotational speed, in particular a value of the variable, such as e.g. a motor current of the electric motor drive system, in particular of the direct current motor, at a time before step a). This allows an intense reduction of the motor rotational speed, in particular the attainment of the standstill state, of the electric motor drive system, in particular such that the back electromotive force or the variable can satisfy, in particular satisfies, the standstill criterion.

In a development of the invention, step b) comprises or has: operating, in particular automatically operating, the electric motor drive system in the running-down operating mode, and in particular not in the braking operating mode. This allows the acquisition of whether the back electromotive force or the variable satisfies the standstill criterion.

In a development of the invention, the standstill criterion is that the back electromotive force, in particular a value of the force, or the variable based on the back electromotive force, in particular a value of the variable, is equal to or less than a standstill upper threshold value. In particular, the standstill upper threshold value may be 0.2 times, in particular 0.1 times, in particular 0.05 times, a value of the force or of the variable at or for a maximum motor rotational speed of the forward-rotating electric motor drive system.

In a development of the invention, the method comprises or has the step, in particular at a time before step a): in a user-triggered manner by way of another change in a, in particular the, signal state, in particular a value of the signal state, of the signalling device, operating, in particular automatically operating, the electric motor drive system in a forward-rotation operating mode in order to effect the forward rotation, in particular in order to increase the motor rotational speed, of the electric motor drive system, which is in particular at a standstill, in particular in order to engage the clutch and for forward drive of the gardening appliance. This makes it possible that the user of the gardening appliance does not need to push said gardening appliance. In particular, the forward-rotation operating mode may differ from the running-down down and/or braking operating mode and/or the backward-rotation operating mode.

In a development, in particular a refinement, of the invention, the user-triggerable signalling device is designed or configured to be, in particular at least partially, movable by the user, in particular for the other change in the signal state of the signalling device, if provided. The traction drive system comprises or has a resetting element. The resetting element is designed or configured to apply force to the signalling device in order to reset a movement of the signalling device, in particular from a triggering position into an initial position, for the change in the signal state of the signalling device. This allows the change in the signal state to be user-triggered and/or user-triggerable, in particular directly or indirectly, by the user upon or as a result of a release of the moving signalling device. In particular, the resetting element may have, in particular be, a spring.

In a development of the invention, the signalling device comprises or has an in particular electrical, switch. The signal state is an, in particular electrical, switching state of the switch. In particular, the switch may be designed to be self-resetting.

In a development of the invention, the traction drive system comprises or has at least, in particular only, one, in particular single, wheel drive shaft. The clutch is, in particular by way of a respective part, in particular mechanically and/or directly operatively connected, in particular rotationally connected, on the drive side to the electric motor drive system and on the output side to the at least one wheel drive shaft. In particular, the, in particular disengaged, clutch, need not or may not be designed for, in particular automatic, engagement as a result of rotation, in particular forward rotation and/or backward rotation, in particular of a part of the clutch, by means of the wheel drive shaft.

In one refinement of the invention, the traction drive system comprises or has at least, in particular exactly, two wheel drive shafts. The clutch comprises or has, in particular only, one, in particular a single, dog clutch and/or, in particular only, one, in particular a single, inclined-surface actuating mechanism per wheel drive shaft. This allows different wheel rotational speeds, in particular different values of the wheel rotational speeds, of the wheel drive shafts, for example during or for cornering of the gardening appliance.

The gardening appliance according to the invention comprises or has a, in particular the, traction drive system. The traction drive system comprises or has a, in particular the, clutch, an, in particular the, electric motor drive system, a, in particular the, user-triggerable signalling device and a, in particular electrical, control or monitoring or operating device. The clutch is designed or configured to, as a result of forward rotation, automatically engage for forward drive of the gardening appliance and, as a result of backward rotation, automatically disengage for freewheeling of the gardening appliance. The electric motor drive system is designed or configured to effect the forward rotation and the backward rotation of the clutch. The control device is designed or configured to, in a user-triggered manner by way of a, in particular the, change in a, in particular the, signal state of the signalling device, in particular automatically, operate the electric motor drive system in a, in particular the, running-down and/or braking operating mode in order to lower a, in particular the, motor rotational speed of the forward-rotating electric motor drive system. Furthermore, the control device is designed or configured to, in particular automatically, acquire whether a, in particular the, back electromotive force caused by the electric motor drive system or a, in particular the, variable based on the back electromotive force satisfies a, in particular the, standstill criterion. The standstill criterion is characteristic of a, in particular the, attainment of a, in particular the, standstill state of the electric motor drive system. In addition, the control device is designed or configured to, if the standstill criterion is met, in particular automatically, operate the electric motor drive system in a, in particular the, backward-rotation operating mode to effect the backward rotation of the electric motor drive system in order to disengage the clutch for freewheeling of the gardening appliance.

The gardening appliance can make possible the same advantage(s) as described above for the method.

In particular, the gardening appliance, in particular the control device, may be designed or configured for, in particular automatically, executing a, in particular the, method as described above. Additionally or alternatively, the gardening appliance, in particular the traction drive system and/or the clutch, the electric motor drive system and/or the signalling device may, in particular in each case, be designed or configured as described above for the method. Further additionally or alternatively, the control device may have, in particular be, a microcontroller.

Further advantages and aspects of the invention arise from the claims and from the following description of preferred exemplary embodiments of the invention, which are explained below on the basis of the figures.

DETAILED DESCRIPTION OF THE DRAWINGS

Figure 1:
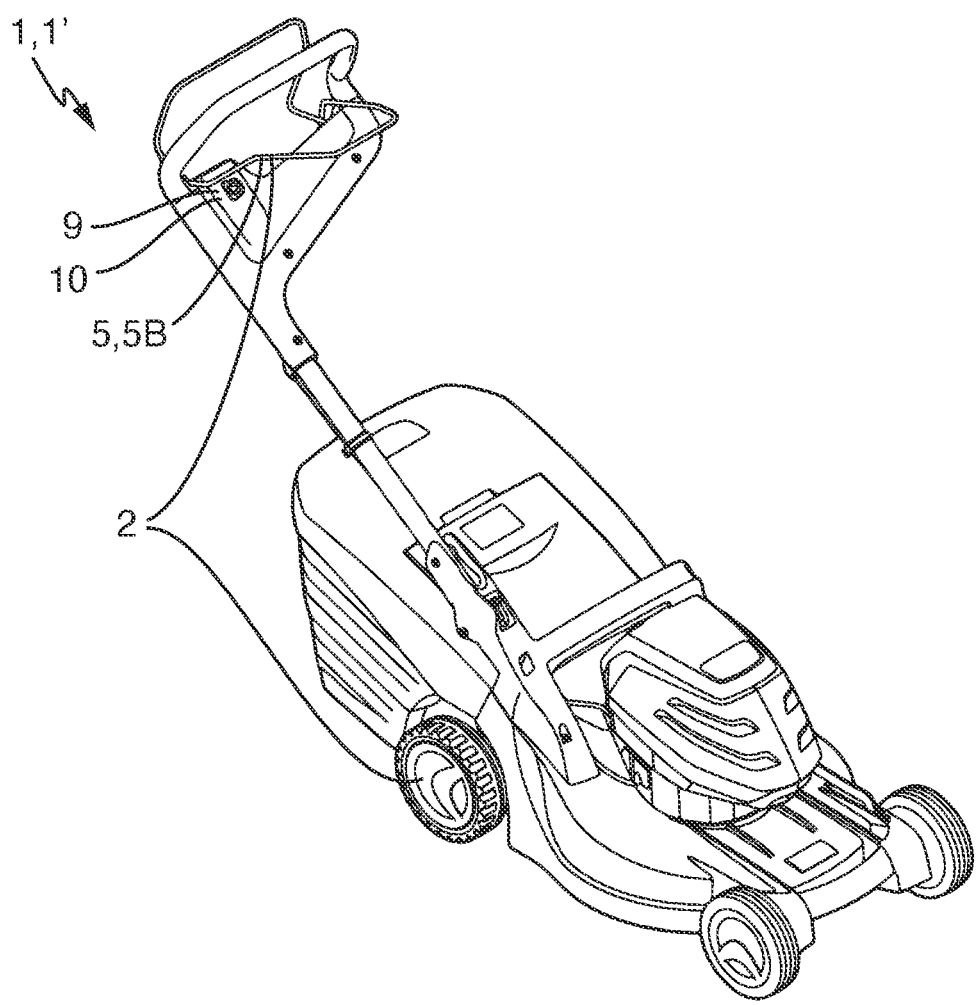
FIG. 1 shows a perspective view of a gardening appliance according to an embodiment of the invention.
Figure 2:
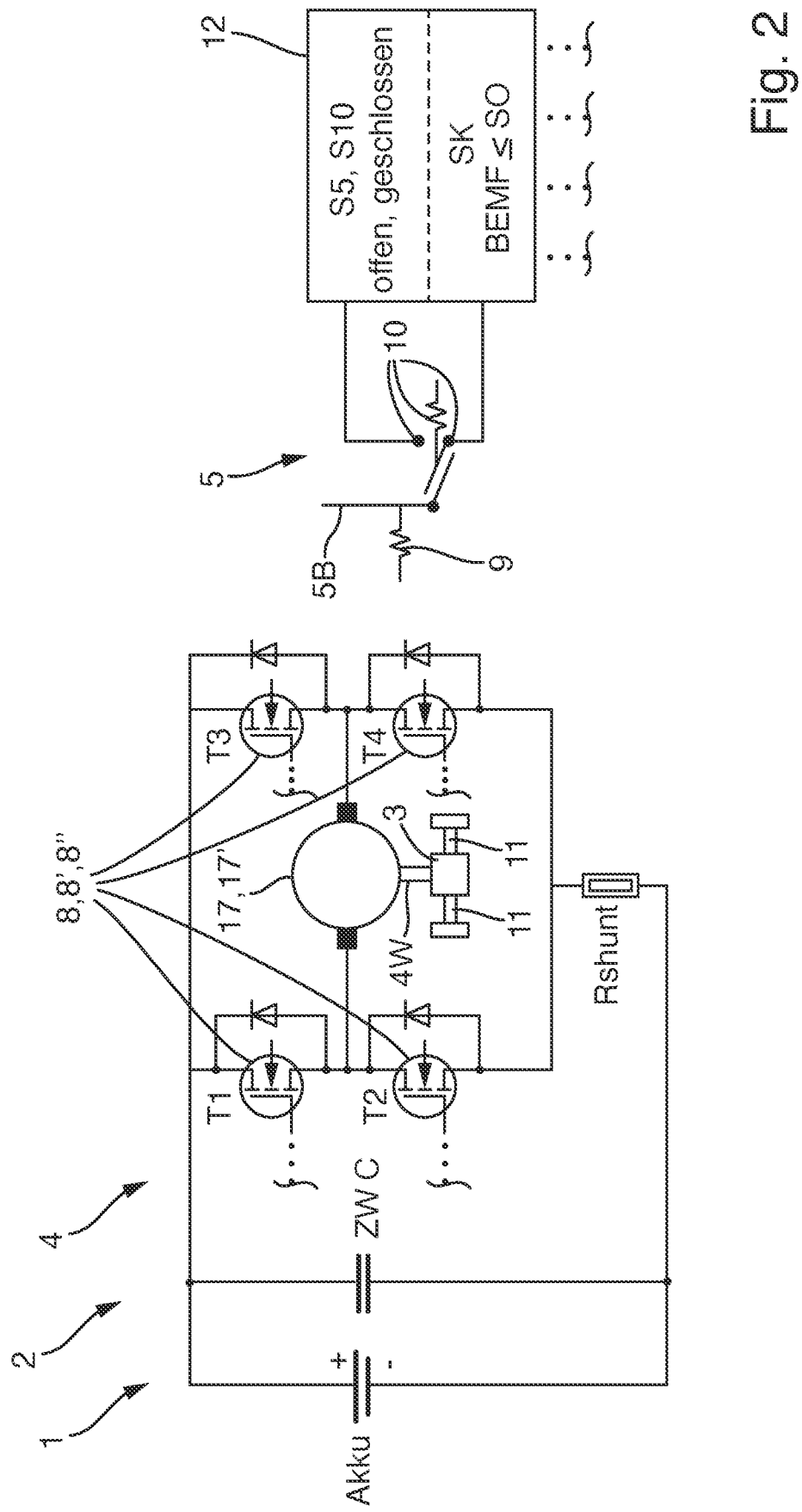
FIG. 2 shows a schematic view, in particular a circuit diagram, of the gardening appliance of FIG. 1.
Figure 3:
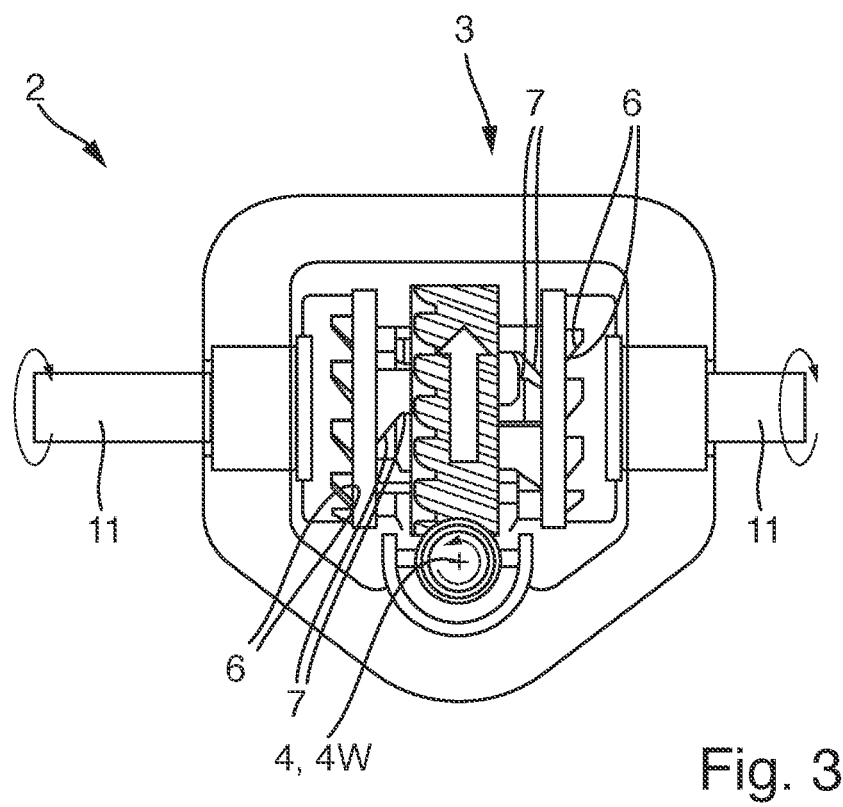
FIG. 3 shows a clutch of a traction drive system of the gardening appliance of FIG. 1 engaged.
Figure 4:
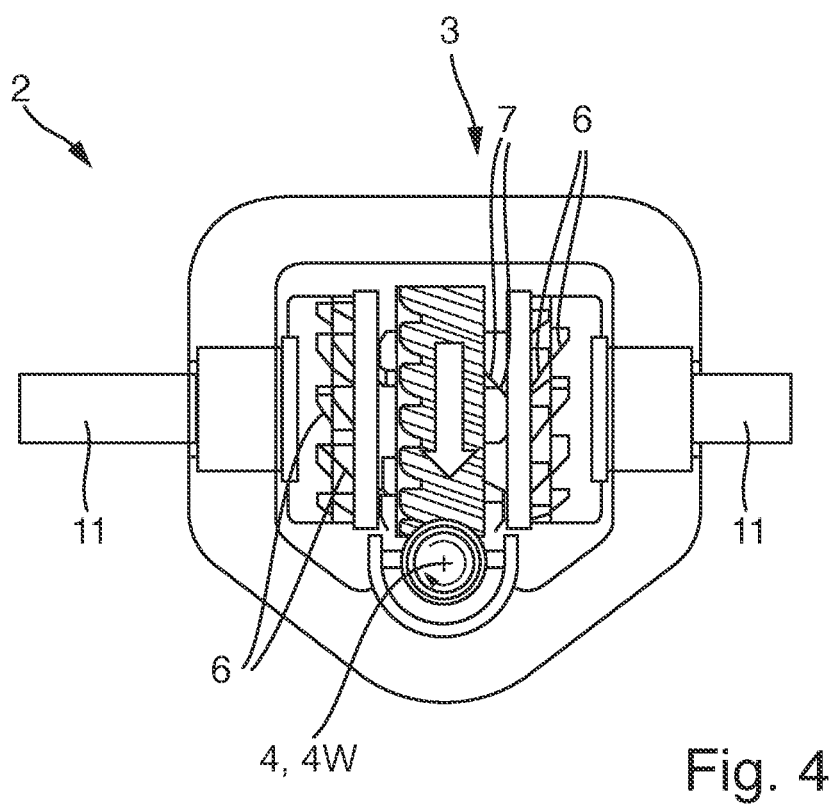
FIG. 4 shows the clutch of FIG. 3 disengaged.
Figure 5:
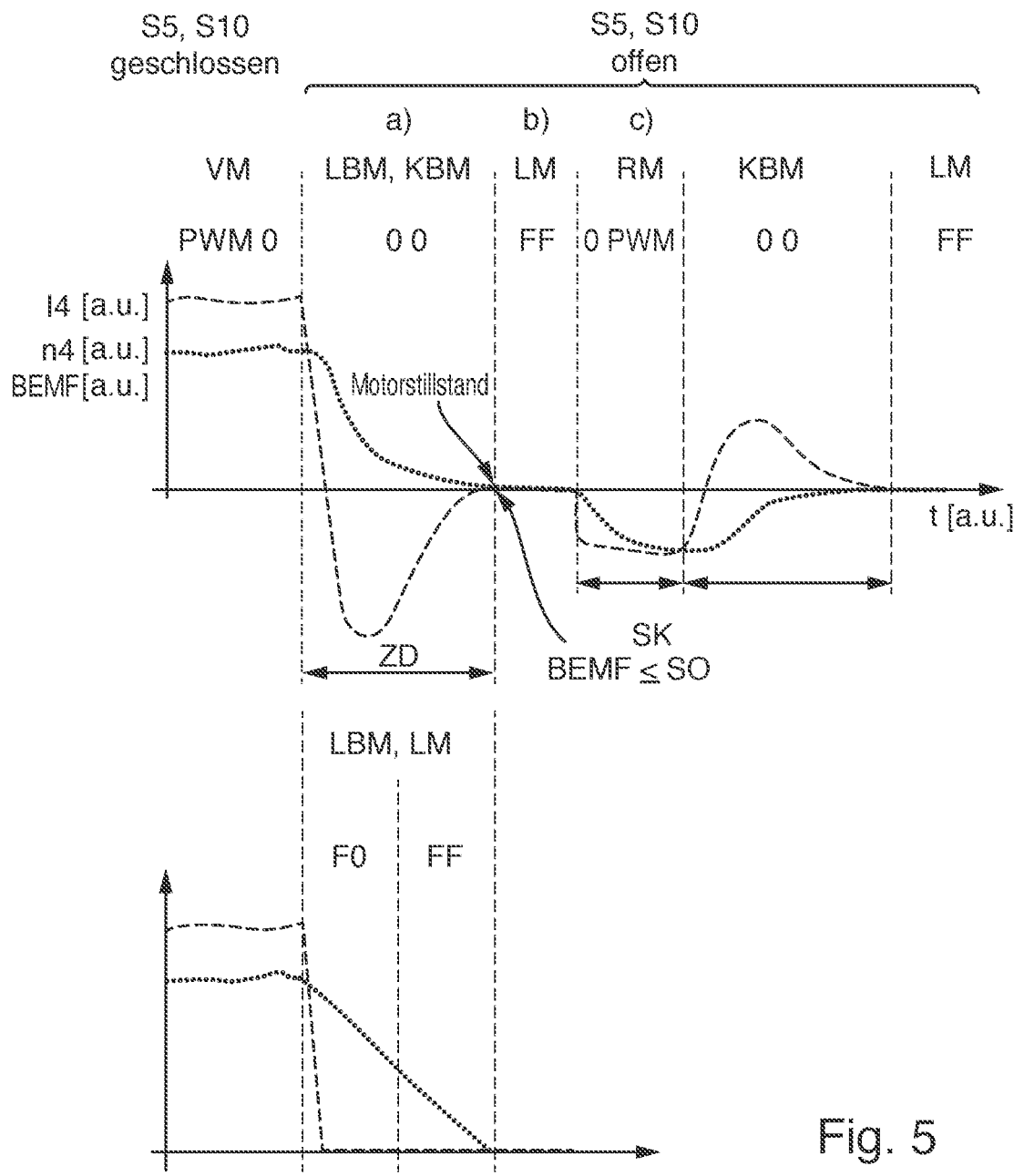
FIG. 5 shows a flow diagram of a method according to an embodiment of the invention for the operation of the gardening appliance of FIG. 1, in particular a graph of a motor rotational speed and a motor current of an electric motor drive system of the traction drive system of the gardening appliance versus the time.

FIGS. 1 and 2 show a gardening appliance 1. The gardening appliance 1 has a traction drive system 2. The traction drive system 2 has a clutch 3, an electric motor drive system 4, a user-triggerable signalling device 5 and a control device 12, The clutch 2 is designed to, as a result of forward rotation, automatically engage for forward drive of the gardening appliance 1, as shown by arrows in FIG. 3, and, as a result of backward rotation, automatically disengage for freewheeling of the gardening appliance 1, as shown by arrows in FIG. 4. The electric motor drive system 4 is configured to effect the forward rotation, as shown in FIG. 3, and the backward rotation, as shown in FIG. 4, of the clutch 3. The control device 12 is designed to, in a user-triggered manner by way of a change in a signal state S5 of the signalling device 5, from closed to open in the exemplary embodiment shown, operate the electric motor drive system 4 in a running-down and/or braking operating mode LBM in order to lower a motor rotational speed n4 of the forward-rotating electric motor drive system 4, as shown in FIG. 5 on the left. Furthermore, the control device 12 is designed to acquire whether a back electromotive force BEMF caused by the electric motor drive system 4 or a variable based on the back electromotive force satisfies a standstill criterion SK, as shown in FIG. 5 in the center. The standstill criterion SK is characteristic of an attainment of a standstill state of the electric motor drive system 4. Furthermore, the control device 12 is designed to, if the standstill criterion SK is satisfied, operate the electric motor drive system 4 in a backward-rotation operating mode RM to effect the backward rotation of the electric motor drive system 4 for the purposes of disengaging the clutch 3 for freewheeling of the gardening appliance 1, as shown in FIG. 5 on the right.

FIG. 5 shows a method for operating the gardening appliance 1. The gardening appliance 1 has the traction drive system 2. The traction drive system 2 has the clutch 3, the electric motor drive system 4 and the user-triggerable signalling device 5. The clutch 3 is designed to, as a result of forward rotation, automatically engage for forward drive of the gardening appliance 1 and, as a result of backward rotation of the clutch, automatically disengage for freewheeling of the gardening appliance 1. The electric motor drive system 4 is designed to effect the forward rotation and the backward rotation of the clutch 3. The method has the steps: a) in a user-triggered manner by way of the change in a signal state S5 of the signalling device 5, operating the electric motor drive system 4 in the running-down and/or braking operating mode LBM in order to lower the motor rotational speed n4 of the forward-rotating electric motor drive system 4, in particular by means of the control device 12; b) acquiring whether the back electromotive force BEMF caused by the electric motor drive system 4 or the variable based on the back electromotive force satisfies the standstill criterion SK, in particular by means of the control device 12, whereas the standstill criterion SK is characteristic of the attainment of the standstill state of the electric motor drive system 4; and c) if the standstill criterion SK is met, operating the electric motor drive system 4 in the backward-rotation operating mode RM to effect the backward rotation of the electric motor drive system 4 for the purposes of disengaging the clutch 3 for freewheeling of the gardening appliance 1, in particular by means of the control device 12.

In detail, the gardening appliance 1 is a lawnmower 1'.

Furthermore, the clutch 3 has at least one dog clutch 6, in the exemplary embodiment shown two dog clutches 6. The dog clutch 6 is designed to, as a result of backward rotation, automatically disengage, in particular rotates backward and automatically disengages, as shown in FIG. 4.

Additionally or alternatively, the clutch 3 has at least one inclined-surface actuating mechanism 7, in the exemplary embodiment shown two inclined-surface actuating mechanisms 7. The inclined-surface actuating mechanism 7 is designed in particular to effect the backward rotation of the dog clutch 6 and, by forward rotation, to effect the automatic engagement, in particular of the dog clutch 6, in particular rotates the dog clutch 6 backward, as shown in FIG. 4, and rotates forward and automatically engages the dog clutch 6, as shown in FIG. 3.

In addition, the traction drive system 2 has at least one wheel drive shaft 11, in the exemplary embodiment shown two wheel drive shafts 11. The clutch 3 is operatively connected on the drive side to the electric motor drive system 4 and on the output side to the at least one wheel drive shaft 11.

In detail, the traction drive system 2 has two wheel drive shafts 11. The clutch 3 has a dog clutch 6 and/or an inclined-surface actuating mechanism 7 for each wheel drive shaft 11.

In alternative exemplary embodiments, the clutch may have only a single dog clutch and/or only a single inclined-surface actuating mechanism. In particular, the traction drive system may have a differential transmission and the clutch may be functionally connected, in particular rotationally connected, on the output side to the two wheel drive shafts by means of the differential transmission. Additionally or alternatively, in alternative exemplary embodiments, the traction drive system may have only a single, in particular continuous, wheel drive shaft.

In the exemplary embodiment shown, the at least one inclined-surface actuating mechanism 7 of the clutch 3 is, in particular directly, operatively connected to the electric motor drive system 4, in particular to a motor drive shaft 4W of the electric motor drive system 4. The at least one inclined-surface actuating mechanism 7 is, in particular directly, operatively connected to the, in particular the respective or associated, dog clutch 6 of the clutch 3. The at least one dog clutch 6 is, in particular directly, operatively connected to the at least one, in particular respective or associated, wheel drive shaft 11.

In other words: the at least one wheel drive shaft 11 is operatively connected, in particular rotationally connected, to the electric motor drive system 4, in particular the motor drive shaft 4W, by means of or via the clutch 3 in the engaged, and in particular not disengaged, state.

Furthermore, with regard to the dog clutch 6, in particular a function, in particular a disengaging function, a bevel of the dog clutch 6 for automatic disengagement as a result of backward rotation, and/or the inclined-surface actuating mechanism 7, reference is made to the technical literature.

Furthermore, in the exemplary embodiment shown, the traction drive system 2 has wheels, in particular two wheels, which are in particular connected rotationally conjointly to the at least one wheel drive shaft 11. In particular, the electric motor drive system 4 is designed to drive the wheels. Otherwise, in the exemplary embodiment shown, the gardening appliance 1 has other, in particular non-driven, wheels.

In alternative exemplary embodiments, in particular if the traction drive system has only a single wheel drive shaft, the gardening appliance may have at least one wheel rotational speed or cornering device, in particular at least two wheel rotational speed or cornering devices, in particular operatively connected, in particular directly, on the drive side to the clutch and/or the wheel drive shaft, and/or operatively connected, in particular directly, on the output side to the, in particular driven, wheels, in particular the respective or associated wheel. This can allow different wheel rotational speeds of the wheels, for example during or for cornering of the gardening appliance.

Furthermore, the method, in particular at a time before step a), has the step: in a user-triggered manner by way of another change in a, in the exemplary embodiment shown the, signal state S5 of the signalling device 5, in the exemplary embodiment shown from open to closed, operating the electric motor drive system 4 in a forward-rotation operating mode VM in order to effect the forward rotation, in particular in order to increase the motor rotational speed n4, of the electric motor drive system 4, in particular in order to engage the clutch 3 and for forward drive of the gardening appliance 1, as shown on the left in 5, in particular by means of the control device 12.

Furthermore, the user-triggerable signalling device 5 is designed to be movable by the user, in particular for the other change in the signal state S5 of the signalling device 5, as shown in FIGS. 1 and 2. The traction drive system 2 has a resetting element 9. The resetting element 9 is designed to apply force, in particular applies force, to the signalling device 5 in order to reset a movement of the signalling device 5 for the change in the signal state S5 of the signalling device 5.

In particular, the signalling device 5 has an operator control element 5B movable by the user. The resetting element 9 is designed to apply force, in particular applies force, to the operator control element 5B in order to reset a movement of the operator control element 5B for the change in the signal state S5 of the signalling device 5.

In the exemplary embodiment shown, the operator control element 5B is in the form of a hoop. In alternative exemplary embodiments, the operator control element may be in some other form, for example in the form of a pushbutton.

The signalling device 5 furthermore has a switch 10. The signal state S5 is a switching state S10 of the switch 10.

In the exemplary embodiment shown, the operator control element 5B is designed to, as a result of the movement, actuate the switch 10, in particular actuates the switch 10, in particular for the other change in the signal state S5 of the signalling device 5 or in the switching state S10 of the switch 10. Furthermore, the resetting element 9 is designed to apply force, in particular applies force, to the signalling device 5 or the operator control element 5B in order to reset the movement of the signalling device 5 or of the operator control element for the change in the signal state S5 of the signalling device 5 or in the switching state S10 of the switch 10. In addition, the switch 10 is designed to be self-resetting, in particular from the switching state S10 closed to the switching state S10 open.

Furthermore, in the exemplary embodiment shown, the method, in particular at a time before step a), has the step: acquiring, in particular automatically acquiring, or detecting, in particular monitoring, the, in particular user-triggered, change, in particular and/or the other change, in the signal state S5 of the signalling device 5 or in the switching state S10 of the switch 10, in particular by means of the control device 12.

In addition, the electric motor drive system 4 has a direct current motor 17, in the exemplary embodiment shown a permanent magnet direct current motor 17'. The direct current motor 17 is designed to effect the forward rotation and the backward rotation of the clutch 3, and in particular rotates the clutch 3 forward or backward.

Furthermore, the electric motor drive system 4 has a bridge circuit 8, in the exemplary embodiment shown a full bridge circuit 8', in particular a four-quadrant chopper 8", for operating the electric motor drive system 4, in the embodiment shown having the direct current motor 17, in at least the running-down and/or braking operating mode LBM and the backward-rotation operating mode RM, in particular by means of the control device 12.

In detail, the four-quadrant chopper 8" has an electronic H-bridge circuit having four semiconductor switches, in the exemplary embodiment shown transistors T1, T2, T3, T4. In other words: the four-quadrant chopper 8" has, two sets of two transistors T1, T2, T3, T4 connected in series, each with a freewheeling diode in reverse polarity. The direct current motor 17 to be operated or controlled is situated in the centre between the two halves or half bridges.

A respective half bridge or the transistors T1 and T2 and the transistors T3 and T4 may, in particular in each case, be operated or controlled or switched as for example follows, in particular by means of the control device 12:
PWM signal (pulse width modulation)→PWM state;
high-side (T1 or T3) on state and low-side (T2 or T4) off state→1 state;
high-side (T1 or T3) off state and low-side (T2 or T4) on state→0 state;
high-side (T1 or T3) off state and low-side (T2 or T4) off state→F state.

Otherwise, with regard to the bridge circuit 8, in particular the full bridge circuit 8', in particular the four-quadrant chopper 8", in particular a function and/or operation or control of the bridge circuit 8, reference is made to the technical literature.

In addition, in step a), the braking operating mode BM is a short-circuit braking operating mode KBM, as shown above in FIG. 5.

Alternatively, in step a), the electric motor drive system 4 is operated in the running-down operating mode LM, as shown in FIG. 5 at the bottom.

Further additionally or alternatively, step b) is carried out at a time after step a), in particular by means of the control device 12.

In addition, in the exemplary embodiment shown, step c) is carried out at a time after step b), in particular by means of the control device 12.

Furthermore, step a) is carried out for a specified time period ZD, in particular in a manner dependent on a most recent motor rotational speed n4 or a most recent variable corresponding to the most recent motor rotational speed n4, for example a motor current I4 of the electric motor drive system 4, at a time before step a), in particular by means of the control device 12.

In addition, in the exemplary embodiment shown, step b) and/or step c) are, in particular in each case, carried out for an, in particular fixedly, specified time period, in particular by means of the control device 12. Additionally or alternatively, step c) may be carried out if or when or as soon as the standstill criterion SK is satisfied.

Step b) furthermore comprises: Operating the electric motor drive system 4 in the running-down operating mode LM, in particular by means of the control device 12.

Furthermore, the standstill criterion SK is that the back electromotive force BEMF or the variable based on the back electromotive force is equal to or lower than a standstill upper threshold value SO.

In the exemplary embodiment shown, the standstill state of the electric motor drive system 4 is attained at the same time as the end of step a). In alternative exemplary embodiments, the standstill state of the electric motor drive system may be attained at a time before the end of or during step a) or at a time after the end of step a) or during or at the same time as an end of step b).

In detail, at a time before step a) or in the forward-rotation operating mode VM, the transistors T1 and T2 are operated in the PWM state and the transistors T3 and T4 are operated in the 0 state.

Furthermore, in step a), in the short-circuit braking operating mode KBM, the transistors T1 and T2 are operated in the 0 state and the transistors T3 and T4 are operated in the 0 state.

Alternatively, in step a), in the run-down operating mode LM, the transistors T1 and T2 are operated in the F state and the transistors T3 and T4 are operated in the F state.

In particular, in the exemplary embodiment shown, in step a), at a time before the running-down operating mode LM, the motor current I4 is reduced, and in particular the transistors T1 and T2 are operated in the F state and the transistors T3 and T4 are operated in the 0 state, in particular for a specified time period.

In addition, in step b), in the run-down operating mode LM, the transistors T1 and T2 are operated in the F state and the transistors T3 and T4 are operated in the F state.

Furthermore, in step c), in the backward-rotation operating mode RM, the transistors T1 and T2 are operated in the 0 state and the transistors T3 and T4 are operated in the PWM state, in particular for a specified time period.

In particular, in the exemplary embodiment shown, in step c), at a time after the backward-rotation operating mode RM, the, in particular backward-rotating, electric motor drive system 4 is operated in the short-circuit breaking operating mode KBM, and in particular the transistors T1 and T2 are operated in the 0 state and the transistors T3 and T4 are operated in the 0 state, in particular for a specified time period.

The method is then ended or the electric motor drive system 4, which is in particular at a standstill, is operated in the running-down operating mode LM, and in particular the transistors T1 and T2 are operated in the F state and the transistors T3 and T4 are operated in the F state.

The traction drive system 2, in particular the electric motor drive system 4, is thus ready to start and/or the clutch 3 is disengaged, in particular for freewheeling of the gardening appliance 1.

Furthermore, in the exemplary embodiment shown, the gardening appliance, in particular the electric motor drive system 4, has an, in particular exchangeable, drive voltage source. In particular, the drive voltage source has a battery Akku, in particular is the battery Akku.

Otherwise, in the exemplary embodiment shown, the control device 12 is designed to interact with the electric motor drive system 4, in particular the bridge circuit 8, and the signalling device 5, in particular the switch 10, as shown in FIG. 1 by dashed and solid lines.

As the exemplary embodiments shown and discussed above make clear, the invention provides an advantageous method for operating a gardening appliance and an advantageous gardening appliance, each having improved characteristics, in particular allowing a high level of user-friendliness and/or a long service life of the gardening appliance.

What is claimed is:

1. A method for operating a gardening appliance,
   wherein the gardening appliance has a traction drive system,
   wherein the traction drive system has a clutch, an electric motor drive system and a user-triggerable signalling device,
   wherein the clutch is designed to, as a result of forward rotation, automatically engage for forward drive of the gardening appliance and, as a result of backward rotation, automatically disengage for freewheeling of the gardening appliance, and
   wherein the electric motor drive system is designed to effect the forward rotation and the backward rotation of the clutch,
   the method comprising the steps of:
   a) in a user-triggered manner by way of a change in a signal state of the signalling device, operating the electric motor drive system in a running-down and/or braking operating mode in order to lower a motor rotational speed of the forward-rotating electric motor drive system;
   b) measuring whether a back electromotive force caused by the electric motor drive system or a variable based on the back electromotive force satisfies a standstill criterion, wherein the standstill criterion is characteristic of an attainment of a standstill state of the electric motor drive system; and
   c) when the standstill criterion is satisfied, operating the electric motor drive system in a backward-rotation operating mode to effect the backward rotation of the electric motor drive system for the purposes of disengaging the clutch for the freewheeling of the gardening appliance.

2. The method according to claim 1,
   wherein the gardening appliance is a lawnmower.

3. The method according to claim 1,
   wherein the clutch has at least one dog clutch, wherein the dog clutch automatically disengages as a result of the backward rotation, and/or
   wherein the clutch has at least one inclined-surface actuating mechanism, wherein the inclined-surface actuating mechanism is designed to effect the backward rotation of the dog clutch and, by the forward rotation, to effect the automatic engagement of the dog clutch.

4. The method according to claim 3,
   wherein the traction drive system has at least two wheel drive shafts, and
   wherein the clutch has the dog clutch and/or an inclined-surface actuating mechanism for each wheel drive shaft.

5. The method according to claim 1,
   wherein the electric motor drive system has a direct current motor,
   wherein the direct current motor is designed to effect the forward rotation and the backward rotation of the clutch.

6. The method according to claim 5,
   wherein the electric motor drive system has a bridge circuit for operating the electric motor drive system having the direct current motor in at least the running-down and/or braking operating mode and the backward-rotation operating mode.

7. The method according to claim 6,
   wherein the bridge circuit is a four quadrant chopper.

8. The method according to claim 5,
   wherein the direct current motor is a permanent magnet direct current motor.

9. The method according to claim 1,
   wherein, in step a), the braking operating mode is a short-circuit braking operating mode, and/or
   wherein step b) is carried out at a time after step a).

10. The method according to claim 1,
    wherein step a) is carried out for a specified time period in a manner dependent on a most recent motor rotational speed or a most recent variable corresponding to the most recent motor rotational speed at a time before step a).

11. The method according to claim 1,
    wherein step b) comprises: operating the electric motor drive system in the running-down operating mode.

12. The method according to claim 1,
    wherein the standstill criterion is that the back electromotive force or the variable based on the back electromotive force is equal to or lower than a standstill upper threshold value.

13. The method according to claim 1,
    wherein the method at a time before step a), comprises the step of:
    in a user-triggered manner by way of another change in a signal state of the signalling device, operating the electric motor drive system in a forward-rotation operating mode in order to effect the forward rotation, in order to increase the motor rotational speed, of the electric motor drive system, in order to engage the clutch and, for forward drive of the gardening appliance.

14. The method according to claim 13,
    wherein the user-triggerable signalling device is designed to be movable by the user for the other change in the signal state of the signalling device, and
    wherein the traction drive system has a resetting element, wherein the resetting element is designed to apply force to the signalling device in order to reset a movement of the signalling device for the change in the signal state of the signalling device.

15. The method according to claim 1,
wherein the signalling device has a switch,
wherein the signal state is a switching state of the switch.

16. The method according to claim 1,
wherein the traction drive system has at least one wheel drive shaft,
wherein the clutch is operatively connected on the drive side to the electric motor drive system and on the output side to the at least one wheel drive shaft.

17. A gardening appliance, comprising:
a traction drive system,
wherein the traction drive system has a clutch, an electric motor drive system, a user-triggerable signalling device and a control device,
wherein the clutch is designed to, as a result of forward rotation, automatically engage for forward drive of the gardening appliance and, as a result of backward rotation, automatically disengage for freewheeling of the gardening appliance, wherein the electric motor drive system is designed to effect the forward rotation and the backward rotation of the clutch, and
wherein the control device is configured to:
in a user-triggered manner by way of a change in a signal state of the signalling device, operate the electric motor drive system in a running-down and/or braking operating mode in order to lower a motor rotational speed of the forward-rotating electric motor drive system,
to measure whether a back electromotive force caused by the electric motor drive system or a variable based on the back electromotive force satisfies a standstill criterion, wherein the standstill criterion is characteristic of an attainment of a standstill state of the electric motor drive system, and
when the standstill criterion is satisfied, operate the electric motor drive system in a backward-rotation operating mode to effect the backward rotation of the electric motor drive system for the purposes of disengaging the clutch for the freewheeling of the gardening appliance.

* * * * *